United States Patent
Leermann et al.

(10) Patent No.: US 12,173,432 B2
(45) Date of Patent: Dec. 24, 2024

(54) ADHESIVE TAPE FOR WRAPPING CABLES

(71) Applicant: CERTOPLAST TECHNISCHE KLEBEBÄNDER GMBH, Wuppertal (DE)

(72) Inventors: Timo Leermann, Wuppertal (DE); Rene Rambusch, Wuppertal (DE)

(73) Assignee: CERTOPLAST TECHNISCHE KLEBEBAENDER, Wuppertal (DE)

( * ) Notice: Subject to any disclaimer, the term of this patent is extended or adjusted under 35 U.S.C. 154(b) by 309 days.

(21) Appl. No.: 17/764,541

(22) PCT Filed: Sep. 10, 2020

(86) PCT No.: PCT/EP2020/075392
§ 371 (c)(1),
(2) Date: Apr. 5, 2022

(87) PCT Pub. No.: WO2021/069174
PCT Pub. Date: Apr. 15, 2021

(65) Prior Publication Data
US 2022/0348794 A1    Nov. 3, 2022

(30) Foreign Application Priority Data

Oct. 11, 2019 (DE) .......................... 202019105635.5

(51) Int. Cl.
| | | |
|---|---|---|
| *B32B 3/10* | (2006.01) | |
| *C09J 7/21* | (2018.01) | |
| *C09J 7/35* | (2018.01) | |
| *D03D 1/00* | (2006.01) | |
| *D03D 15/283* | (2021.01) | |

(52) U.S. Cl.
CPC .............. *D03D 1/0035* (2013.01); *C09J 7/21* (2018.01); *C09J 7/35* (2018.01); *D03D 15/283* (2021.01); *C09J 2203/302* (2013.01); *C09J 2301/304* (2020.08); *C09J 2400/263* (2013.01); *C09J 2421/00* (2013.01); *C09J 2423/04* (2013.01); *C09J 2433/00* (2013.01); *C09J 2467/006* (2013.01); *C09J 2471/00* (2013.01); *C09J 2477/006* (2013.01); *C09J 2483/00* (2013.01)

(58) Field of Classification Search
None
See application file for complete search history.

(56) References Cited

U.S. PATENT DOCUMENTS

| | | |
|---|---|---|
| 3,482,606 A | 12/1969 | Mizuno |
| 6,790,505 B1 | 9/2004 | Goux |
| 2016/0304751 A1 * | 10/2016 | Müssig .................... C09J 7/255 |
| 2019/0218422 A1 | 7/2019 | Rambush |
| 2021/0371708 A1 | 12/2021 | Leermann |

FOREIGN PATENT DOCUMENTS

| | | | |
|---|---|---|---|
| EP | 1911633 A | 4/2008 | |
| GB | 2408515 A * | 6/2005 | ................ C09J 7/21 |

* cited by examiner

*Primary Examiner* — Christopher M Polley
(74) *Attorney, Agent, or Firm* — Andrew Wilford

(57) ABSTRACT

The invention relates to an adhesive tape, in particular wrapping tape, for sheathing automotive cables, having a textile support and at least one adhesive coating layer applied to one side or both sides of the textile support, and the textile support being manufactured entirely or partially from bio-based polymer fibers and/or polymer yarns, characterized in that the textile support is constituted of multi-weft yarns and/or multi-warp yarns.

15 Claims, 1 Drawing Sheet

ADHESIVE TAPE FOR WRAPPING CABLES

CROSS REFERENCE TO RELATED APPLICATIONS

Figure 1:
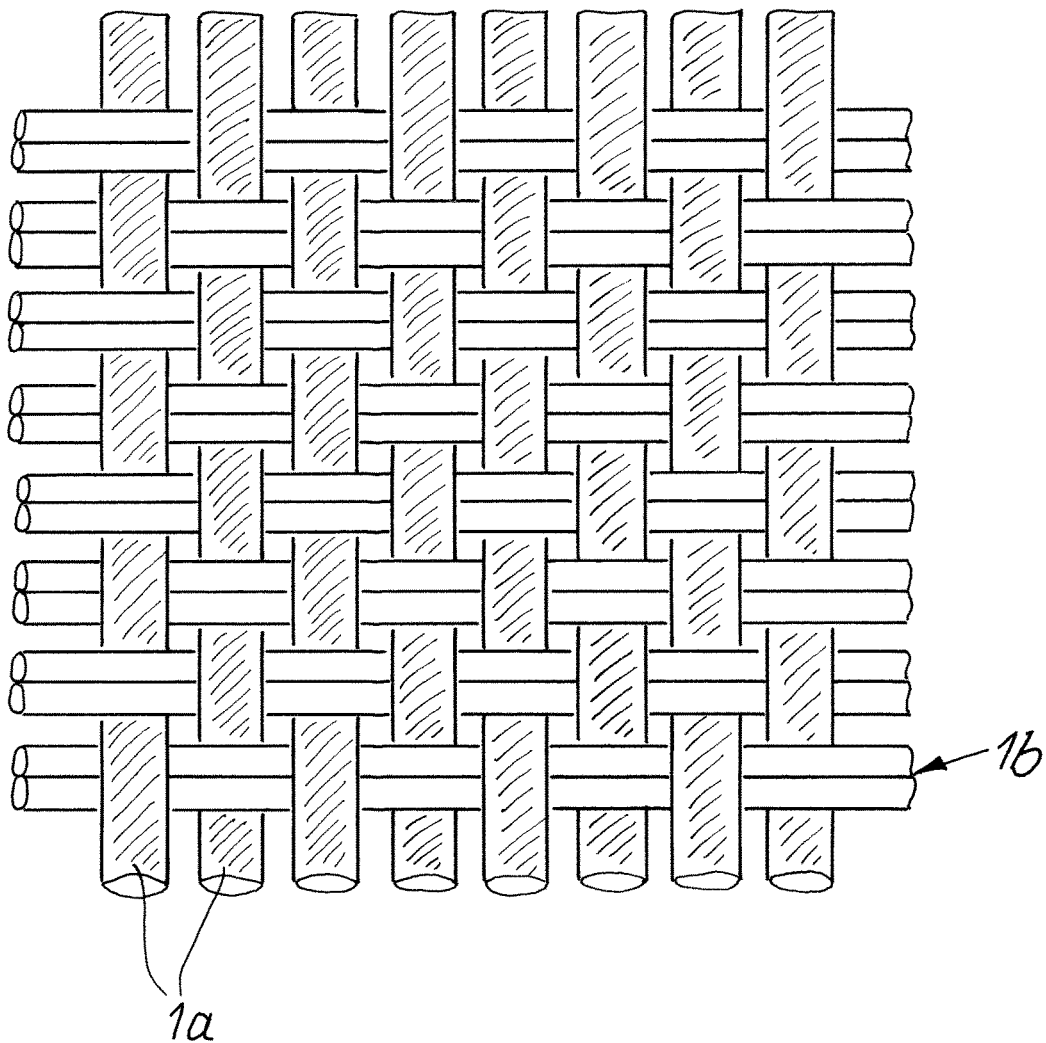

This application is the US-national stage of PCT application PCT/EP2020/075392 filed 10 Sep. 2020 and claiming the priority of German patent application 202019105635.5 itself filed 11 Oct. 2019.

The invention relates to an adhesive tape, in particular a tape for wrapping cables in automobiles, comprising a textile substrate band and an adhesive coating on one or both faces of the textile substrate band, the textile substrate band being made entirely or partially of bio-based polymer fibers and/or polymer filaments.

Adhesive tapes and in particular winding tapes for wrapping cables in automobiles need not only be solvent-resistant with respect to, for example, oil and gasoline, but also have a high temperature resistance. In fact, such winding tapes are typically used in the range between −50° C. and +150° C. and more. In addition, such adhesive tapes should have sufficient abrasion resistance and thus wear resistance. This is because the cable bundles or wiring harnesses wrapped with the adhesive tapes in question can rub against body components of the automobile so that good abrasion resistance is required. In addition, sound insulation also plays a role in order to prevent rattling noise.

The cables are wrapped with the aid of the adhesive tape or winding tape in order to bundle them or protect them against abrasion stress. The wrapping of the cables can be effected in such a way that the adhesive tape is wound around the cable bundle in a spiral or helix. In principle, it is also possible to make a longitudinally and axially extending casing for the cable bundle with the aid of the adhesive tape.

If abrasion-resistant adhesive tapes are considered, they can be divided into abrasion classes according to the standard LV 312 "Adhesive tapes for cable sets in motor vehicles" (2009). This is a common test standard of the companies Audi, BMW, Daimler and VW. The abrasion resistance in question according to LV 312 is determined in accordance with DIN ISO 6722 in that the adhesive tape to be tested is first glued onto a mandrel (metal rod) having a diameter of 5 mm. The adhesive tape is then subjected to a scraping tool of a needle diameter of 0.45 mm, taking into account a weight force of 10 N, and in this case the number of strokes required to scrub the adhesive tape is determined. For example, the abrasion class B according to LV 312 (2009) corresponds to at least 100 strokes before penetration.

Further details for measuring the abrasion resistance and the division into different abrasion classes are described for example in EP 1 911 633. A textile substrate band is also used at this point. The fabric is one made from a yarn based on a polyamide material. The thickness or yarn fineness is at least 280 dtex. Such yarns are relatively expensive and costly due to this yarn thickness and taking into account the material used (polyamide). This also true because of the fact that the abrasion class E according to LV 312 is fulfilled at this point.

In addition to the above-described requirements for such adhesive or winding tapes with regard to media resistance and temperature resistance as well as desired sound insulation, further requirements often play a role nowadays. In fact, it is increasingly important that the adhesive tapes in question have an improved recycling capability and in particular a resource-conserving manufacture. This can be attributed inter alia to the fact that the consumption of winding tapes for making such wiring harnesses has increased considerably in comparison to the past on account of the increasing lengths of cable sets. As a result, the resource-conserving manufacture results in increased and particular importance.

According to the generic prior art of DE 20 2019 100588 [US 2021/0371708], which has already been taken into account, now the textile substrate band is made at least partially with bio-based polymers. Bio-based polymer fibers and/or polymer filaments are used. In this context, the substrate can be designed, inter alia, as a textile substrate band. This has proven successful in principle.

However, previously convincing approaches to the effect of equipping such adhesive tapes with a substrate made of bio-based polymer fibers and/or polymer filaments with the required abrasion resistance are missing. If high abrasion resistances are required at this point, as described in above-mentioned EP 1 911 633, this can only be achieved by very thick filaments of at least 280 dtex. This leads to increased production costs. In addition, correspondingly designed substrate bands cannot be torn by hand. This is particularly disadvantageous insofar as such adhesive tapes or winding tapes are typically processed manually and manual tearability during processing is of particular and increased significance. The object of the invention is to provide a remedy here.

The object of the invention is to further improve such an adhesive tape and in particular a winding tape for wrapping cables in automobiles in such a way that a design which can be torn open as far as possible is observed in conjunction with high abrasion resistance and at the same time resource-conserving manufacture.

In order to attain this object, an adhesive tape of the generic type and in particular a winding tape in the context of the invention is characterized in that the textile substrate band is composed of multicomponent weft yarns and/or multicomponent warp yarns.

In the context of the invention, the textile substrate band is initially made entirely or partially from bio-based polymer fibers and/or polymer filaments. In fact, filaments or yarns, i.e. endless filaments, are predominantly used at this point. These form the base for the warp and weft yarns. In this case, the warp yarns as well as the weft yarns can be made entirely or partially from bio-based polymer filaments.

For example, it is conceivable that the warp yarns are made from petrochemically made polymer filaments, while the weft yarns are bio-based polymer filaments. In addition, it is of course also possible to proceed vice versa. Finally, it is also possible to mix the polymer filaments in the warp and/or in the weft, that is to say to use both petrochemically made polymer filaments and bio-based polymer filaments.

In the sense of a particularly resource-conserving manufacture, however, according to the invention, the substrate band is mainly or completely made from the bio-based polymer filaments. In addition, it has proven successful in principle if the textile substrate band is composed of monocomponent warp filaments and multicomponent weft yarns. Such multicomponent weft yarns can in principle be introduced into a conventional fabric with a modified loom, as is known in principle and has been known for a long time and is described in more detail for example in DE 17 103 20 [U.S. Pat. No. 3,482,606]. In this case, storage is provided for temporarily receiving the individual weft yarns. A pressure medium can expel the weft yarns from nozzles into the sheds formed by the warp yarns.

According to the known procedure, for example, two weft yarns can be introduced into a shed of the warp yarns in the case of a woven fabric with monocomponent warp filaments. In addition to such a design with double weft yarns as the simplest form of the multicomponent weft yarns, embodiments in the context of the invention with more than two weft yarns are of course also conceivable. The individual weft filaments of the multicomponent weft yarn run parallel to each other and without mutual influencing each other or without mechanical connection to each other. This makes it possible to work with relatively thin weft yarns and can nevertheless achieves significant abrasion strengths of the adhesive tape according to the invention.

As a result of using multicomponent weft yarns, it is also possible to design the adhesive tape as a whole in a hand-tearable manner. Thus, as a result of the design of the warp yarns as monocomponent warp filaments, tearing forces in the direction of the weft yarns, that is to say in the transverse direction, of approximately 10 N/cm width in the transverse direction can rupture the monocomponent warp filaments. Since the monocomponent warp filaments typically have a filament thickness of at least 100 dtex and preferably at least 200 dtex, the desired manual tearability or transverse tearability can be achieved in principle.

In this context, the multicomponent weft yarns are primarily required for the achievable abrasion resistance. In fact, with such multicomponent weft yarns, for example, the abrasion class C according to LV 312 can be achieved. This already applies to the case in which double weft yarns with a filament fineness of at least 40 dtex per filament are used. As a result, the double weft yarn has a composite filament fineness of 80 dtex. When using a triple weft yarn, a filament thickness of at least 120 dtex is observed and in the case of quadruple weft yarns, for example, a filament thickness of 160 dtex is observed.

In any case, the multicomponent weft yarns primarily ensure the desired abrasion resistance, while comparable values for the abrasion resistance are achieved, as are observed in EP 1 911 633. Since, in contrast thereto, multicomponent weft yarns are not used with thick weft yarns, manufacture is simplified at the same time and can be carried out more cost-effectively than in the prior art. The multicomponent weft yarns have the advantage that the multicomponent weft yarns enhance tearability.

This can be attributed basically to the fact that the operation of manual tearing takes place along the weft yarns and in this case it is important that the warp yarns in the fabric retain their position and are not pressed together, for example. As a result of the fact that the multicomponent weft yarns are of an overall larger cross-section than monocomponent weft yarns of the same filament thickness in this transverse direction, which is related to the tearability, the monocomponent warp filaments are held in place in this case and can consequently be torn easily. The multicomponent weft yarns thus assume the function of the adhesive coating in a certain way, as described in detail in the prior art according to DE 60 031 332 [U.S. Pat. No. 6,790,505].

In order to achieve sufficient stability of the substrate band, a plain weave is usually used in its manufacture. In principle, however, a twill or also an atlas weave can also be used. The monocomponent warp filaments generally have a filament thickness of at least 100 dtex. The filament thickness can preferably also be 200 dtex and more. A respective filament thickness of also more than 100 dtex or 200 dtex and more is preferred for the multicomponent weft yarns. That is to say, in this case, the monocomponent warp filaments and the multicomponent weft yarns can in principle be made from the same raw material, namely by only using a bio-based polymer filament or a yarn having a filament thickness of at least 100 dtex.

The monocomponent warp yarns and/or the multicomponent warp yarns generally consist of biopolyamide- or biopolyester-based filaments. That is, the filaments used at this point are made for example from biopolyamide. In this case, the monomers or amines of the biopolyamide are made in whole or in part from castor oil. The additionally required carboxylic acid can be produced petrochemically or also biobased. If biopolyester-based filaments are used alternatively or additionally at this point, they can be made for example, from PET (polyethylene terepthalate) by polycondensation from monoethylene glycol (ethylene glycol) and terephthalic acid. Here, it is possible to make the monoethylene glycol from sugar cane molasses. The terephthalic acid, on the other hand, can be made petrochemically. It is also possible to produce the terephthalic acid bio-based.

In any case, the respective biopolyamide- or biopolyester-based filaments can now be produced in whole or in part from renewable raw materials based on plant materials. Hybrid forms are also conceivable in such a way that both renewable raw materials and petrochemical raw materials are used.

Further hybrid forms are conceivable in such a way that the textile uses either only petrochemical-based polymer filaments or only plant-based polymer filaments for both the warp and weft yarns. In addition, hybrid petrochemically produced polymer filaments and bio-based polymer filaments can also be used in both the warp and the weft. In this way, the manufacture of the textile substrate band for the adhesive tape according to the invention can be flexibly adapted to the availability of the resources (petrochemicals or plant-based materials) and also the price, and any fluctuations can be flexibly responded to.

It has proven useful if between 10 and 80 weft yarns per centimeter are provided in the textile substrate at this point. If double weft yarns are used as an example, this means that the textile substrate in this case has 5 double weft yarns/cm to 40 double weft yarns/cm. This is because the 5 double weft yarns/cm correspond to 10 individual weft yarns/cm, while 40 double weft yarns/cm correspond to 80 individual weft filaments/cm if each individual weft filament is counted. The number of warp filaments is generally limited to 10 to 50 warp filaments/cm. Single warp monofilaments are known to be used advantageously at this point.

The basis weight of the textile substrate backing can generally be set between 50 g/m$^2$ and 500 g/m$^2$. In particular, a basis weight in the range between 150 g/m$^2$ to 250 g/m$^2$ is observed. Furthermore, the invention generally operates such that the textile substrate is formed as a single layer, that is, having only one fabric layer (and no more). In principle, however, the textile substrate band can also be made from several fabric layers, which have the construction or structure described in detail above. The thickness of the fabric support is generally less than 0.8 mm.

The adhesive coating has proven to be particularly favorable on the basis of a synthetic-rubber adhesive, a hot-melt adhesive, an acrylate-based adhesive, an adhesive based on silicone, polyurethane, polyether and/or polyolefin. The adhesive can in principle be cross-linked and in particular radiation-cross linked after application. It is also possible to apply the adhesive coating over the entire surface or in strips onto the textile substrate band.

As a result, an adhesive tape is provided that is first of all characterized by a particularly resource-conserving manufacture. Furthermore, the special abrasion resistance can be made and implemented on a textile substrate band made of multicomponent weft yarns and/or multicomponent warp yarns. In fact, it is observed according to the invention that, taking into account the specified filament fineness for monocomponent warp filament in conjunction with the double weft yarns, the abrasion class C according to LV 312 is reached at a minimum, specifically both on a 5 mm mandrel and on a 10 mm mandrel. In the control case and in the case of higher filament fineness units than the specified 100 dtex for the monocomponent warp filaments or the individual filaments of the double weft yarn or when using three or four-shed weft yarns, it is of course also possible to achieve significantly higher abrasion resistances, for example in accordance with abrasion class D or even more. This is all possible taking into account a particularly cost-effective and resource-conserving construction. In addition, the return to the multicomponent weft yarns ensures the basic possibility of changing and implementing the manual tearability of the abrasion-resistant adhesive tape according to the invention unchanged. The essential advantages are to be seen herein.

Figure 2:
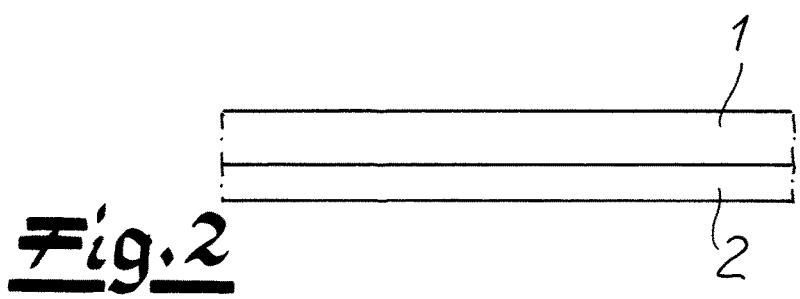

The invention is described in more detail below with reference to a drawing showing only one embodiment. Therein:

FIG. 1 is a top view of the textile substrate band of the adhesive tape according to the invention and FIG. 2 is a schematic section through the adhesive tape according to the invention.

The drawing shows show an adhesive tape for wrapping cables in automobiles. In fact, the adhesive tape is normally used in a limiting manner by being be wound around a cable bundle or a cable set in a spiral or helical movement. For this purpose, the adhesive tape has, in its basic construction, a textile substrate band 1 and an adhesive coating 2 on only one face thereof. According to the embodiment, the adhesive coating 2 is applied over one entire face of the textile substrate band 1.

The plan view in FIG. 1 shows that the textile substrate band 1 is composed of warp yarns 1a and weft yarns 1b that according to the embodiment are woven together in a plain weave. A further special feature is that the textile substrate band 1 is composed of monocomponent warp filaments 1a and double weft yarns 1b.

This means that the weft yarns or double weft yarns 1b are in each case two individual weft yarns that are shot into a shed of the warp yarns 1a in the course of weaving. As a result, the adhesive tape made in this way has a high abrasion resistance on the one hand and, on the other hand, manual tearability in the transverse direction or parallel to the double weft yarns 1b.

According to the embodiment, the monocomponent warp filaments 1a and the double weft yarns 1b each consist of filaments on a biopolyamide or bio-polyester base. In the context of the embodiment, 10 to 50 monocomponent warp filaments 1a per centimeter are used in the textile substrate band 1. The number of double weft yarns in the textile substrate band 1 is between 5 and 40 double weft yarns 1b per centimeter.

The invention claimed is:

1. An adhesive tape for wrapping cables in automobiles, the tape comprising:
   a textile substrate band made entirely or partially of bio-based polymer fibers and/or bio-based polymer filaments and composed of multicomponent weft yarns and/or multicomponent warp yarns so as to meet abrasion-resistance standard of class C of LV 312; and
   an adhesive coating covering one or both faces of the textile substrate band.

2. The adhesive tape according to claim 1, wherein the textile substrate band consists of monocomponent warp filaments and multicomponent weft yarns.

3. The adhesive tape according to claim 1, wherein the monocomponent warp filaments have a filament thickness of at least 100 dtex.

4. The adhesive tape according to claim 1, wherein the multicomponent weft yarns each have a filament thickness of at least 100 dtex.

5. The adhesive tape according to claim 1, wherein the multicomponent warp yarns and/or the multicomponent weft yarns consist of filaments on a biopolyamide or biopolyester base.

6. The adhesive tape according to claim 5, wherein monomers of the biopolyamide are completely or partially made from castor oil.

7. The adhesive tape according to claim 1, wherein 10 to 80 weft yarns/cm are provided in the textile substrate band.

8. The adhesive tape according to claim 1, wherein 10 to 50 warp yarns/cm are provided in the textile substrate band.

9. The adhesive tape according to claim 1, wherein the multicomponent weft yarns are at least double weft yarns.

10. The adhesive tape according to claim 1, wherein the weight per unit area of the textile substrate band is between 50 g/m$^2$ and 500 g/m$^2$.

11. The adhesive tape according to claim 1, wherein the textile substrate band is formed in only one layer.

12. The adhesive tape according to claim 1, wherein a material thickness of the textile substrate band is less than 0.8 mm.

13. The adhesive tape according to claim 1, wherein the adhesive coating has a rate per unit area of the band from 20 g/m$^2$ to 200 g/m$^2$.

14. The adhesive tape according to characterized claim 1 wherein the adhesive of the adhesive layer is a synthetic-rubber adhesive, a hot-melt adhesive, an acrylate-based adhesive, or an adhesive based on silicone, polyethylene, polyether and/or polyolefin.

15. The adhesive tape according to claim 1, wherein the adhesive coating is applied to the substrate over its entire surface or in strips.

* * * * *